United States Patent
Lee et al.

(10) Patent No.: US 6,306,982 B1
(45) Date of Patent: Oct. 23, 2001

(54) PROCESS FOR THE PRODUCTION OF GENERAL PURPOSE PSA'S

(75) Inventors: Ivan S. P. Lee, Arcadia, CA (US); Charles R. Williams, Lock Haven, PA (US); Colin C. Smith, State College, PA (US); James R. Bodwell, Boalsburg, PA (US); James P. Akeley, Lock Haven, PA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 08/905,073

(22) Filed: Jul. 31, 1997

(51) Int. Cl.[7] ........................................ C08F 2/10
(52) U.S. Cl. .................. 526/80; 526/81; 526/224; 526/229; 526/287; 526/230; 526/225; 526/318.43; 526/318.44
(58) Field of Search .................. 526/80, 81, 287, 526/318.43, 318.44, 224, 229, 230, 225

(56) References Cited

U.S. PATENT DOCUMENTS

| | | | |
|---|---|---|---|
| 3,248,356 | 4/1966 | Snyder | 260/29.6 |
| 4,371,659 | 2/1983 | Druoshke et al. | 524/599 |
| 4,725,639 | * 2/1988 | Lenney | 524/460 |
| 4,948,822 | * 8/1990 | Iovine et al. | 523/201 |
| 5,129,126 | 7/1992 | Huang | 24/3 |
| 5,164,444 | 11/1992 | Bernard | 524/833 |
| 5,264,532 | 11/1993 | Bernard | 526/261 |
| 5,278,227 | 1/1994 | Bernard | 524/817 |
| 5,405,879 | 4/1995 | Uemae et al. | 523/201 |
| 5,550,181 | * 8/1996 | Scholz | 524/460 |

FOREIGN PATENT DOCUMENTS

| | | | |
|---|---|---|---|
| 0037923B2 | 10/1981 | (DE) . | |
| 3544882 | 11/1986 | (DE) . | |
| 0144723 | 6/1985 | (EP) . | |
| 522791 | 1/1993 | (EP) . | |
| 61264077 | 11/1986 | (JP) | 524/460 |
| WO9220722 | 11/1992 | (WO) . | |
| WO9314161 | 7/1993 | (WO) . | |
| WO9608320 | 3/1996 | (WO) . | |

OTHER PUBLICATIONS

English–language translation of Japanese Patent No. 264,077 (Nov. 1986).

* cited by examiner

Primary Examiner—David W. Wu
Assistant Examiner—Ling-Siu Choi
(74) Attorney, Agent, or Firm—Christie, Parker & Hale, LLP

(57) ABSTRACT

General purpose inherently tacky acrylic pressure sensitive adhesive polymers formed of alkyl acrylates, vinyl esters, diesters of dicarboxylic acid and saturated carbocylic acids, having improved properties, a lower residual monomer content and a reduced polymerization time are formed by a sequential polymerization process in which 50 to 95 percent, typically 90 percent, of the monomers are incrementally added to a reactor as a first charge containing substantially all of the vinyl esters, preferably all of the diesters of dicarboxylic acid, the balance of the monomers being fed in a second incremental charge.

15 Claims, 4 Drawing Sheets

PROCESS FOR THE PRODUCTION OF GENERAL PURPOSE PSA'S

FIELD OF THE INVENTION

The present invention pertains to a process for reducing residual monomers in the formation of inherently tacky acrylic PSA emulsion copolymers containing a copolymerized amount of at least one vinyl ester and at least one diester of a dicarboxylic acid.

BACKGROUND OF THE INVENTION

Inherently tacky pressure sensitive adhesive (PSA) acrylic polymers formed by emulsion polymerization and which contains a polymerized amounts of at least one vinyl ester and at least one diester of a carboxylic acid, are described in U.S. Pat. Nos. 5,129,126, 5,164,444, 5,264,532 and 5,278,227 to Bernard each incorporated herein by reference. The adhesive products have enjoyed immense commercial success as a general purpose acrylic pressure sensitive adhesives.

The water borne pressure-sensitive adhesives exhibit excellent guillotinability and excellent adhesive performance at room temperature and after elevated temperature aging. Multifunctional monomers may be used to provide hydrogen bonding with functional groups such as carboxyl groups and enhance adhesion to polar substrates without affecting peel and tack. Shear performance may be enhanced by metal cross-linking. Metal cross-linking also creates a highly cohesive net work which enhances guillotine performance.

The inclusion of the vinyl esters, such as vinyl acetate and diesters of dicarboxylic acids, such as dioctyl maleate (DOM) create problems in production. Typical residual vinyl ester monomer content has been high, ranging from about 0.5 to about 1 percent by weight of total monomers fed to the reactor for a typical 3000 gallon stirred emulsion polymerization reactor. In addition, reaction rate is slow, requiring a slow feed lasting over a period of about 10 or more hours. It would be ecologically desirable to reduce residual monomer content of the emulsion polymerization reaction and, if possible, to economically reduce the amount of time required for monomer addition.

SUMMARY OF THE INVENTION

It is has now been found that the residual monomer content in commercial polymerization of inherently tacky acrylic emulsion polymers containing at least one vinyl ester and at least one diester of dicarboxylic acid, can be significantly reduced and rate of monomer addition significantly increased by conducting the reaction using a sequential polymerization process.

In the sequential polymerization process, there is fed a first charge of monomers constituting from 50 to about 95 percent, preferably 85 percent to about 90 percent, more preferably about 90 percent of the total monomers to form core polymer particles. Substantially all, and preferably all, of the vinyl esters and at least part, and preferably all, of the diester of dicarboxylic acids are included in the first charge of monomers to the reactor. This is followed by addition of the remaining monomers which are substantially free of vinyl esters and preferably free of diesters of dicarboxylic acids. By following this procedure, reaction time, for a 3000 gallon reactor, can be reduced to about 6 hours and residual monomer content reduced to about 0.1 percent or less and within 24 hours of adding a redox catalyst to levels of about 0.05 percent of total monomers fed to the reactor.

The inherently tacky, emulsion pressure-sensitive adhesive polymers of the instant invention comprise, on a polymerized basis and based on the total weight of the monomers forming the polymer, at least one soft monomer having a homopolymerization glass transition temperature (Tg) of less than 0° C. Preferably the soft monomer is an alkyl acrylate containing from about 4 to about 12 carbon atoms in the alkyl group, most preferably a mixture of 2-ethylhexyl acrylate and butyl acrylate. The total of the soft monomers are present in an amount of from about 35 to about 95 percent by weight of the monomers.

The polymer contains at least one hard monomer having a homopolymerization glass transition temperature (Tg) greater than about 0° C. and preferably further includes a soft diester monomer such as a maleate and/or fumarate.

More preferably, the inherently tacky emulsion pressure-sensitive adhesive polymers of the instant invention comprise, on a polymerized basis and based on the total weight of the polymer, at least one alkyl acrylate containing from about 4 to about 8 carbon atoms in the alkyl group, preferably a mixture 2-ethylhexyl acrylate and butylacrylate, said alkyl acrylates present in a total amount of from about 30 to about 65 percent by weight of monomers; at least one vinyl ester containing from 2 to about 16 carbon atoms in the alkyl chain of the acid, preferably vinyl acetate, said vinyl ester present in a total amount of from about 15 to about 35 percent by weight of the monomers; at least one diester of a dicarboxylic acid wherein each alkyl group of the diester independently contains from about 6 to about 12 carbon atoms, with dioctyl maleate or dioctyl fumarate being preferred, said diesters being present in a total amount of from about 20 to about 40 percent by weight; and at least one unsaturated carboxylic acid containing from 3 to 5 carbon atoms, preferably acrylic and/or methacrylic acid in an amount up to about 5 percent by weight, preferably about 1 to about 3 percent by weight of the monomers. The emulsion copolymer typically has a glass transition temperature of less than about −30° C. and a typical gel content of from about 50 to about 70 percent by weight of the copolymer particles.

The emulsion polymers may be formed in the presence about 0.1 to about 1 percent of a multifunctional monomer having an acrylate, methacrylate, cyanurate or phosphate functionality with tris(2-hydroxy ethyl)isocyanurate triacrylate and bis(methylacryloxyethyl)phosphate presently preferred. The use of the multifunctional monomers having cyanurate or phosphate moieties give a significant improvement in cohesive strength without much loss of peel and tack. The multifunctional monomers may be used with or without a chain transfer agent, and cross-linking agents, e.g. metal salts such as aluminum acetate.

The emulsion adhesive copolymers are optionally prepared using a reactive surfactant which polymerizes and becomes part of the emulsion polymer and which has been observed to enhance cohesive strength and aid in copolymerization of the monomers in forming the emulsion pressure-sensitive adhesive copolymers. The amount of reactive surfactant employed in the preparation of the emulsion pressure-sensitive adhesives of the present invention is in an amount of from 0 to about 0.4 percent by weight of the total monomers, typically from about 0.1 to about 0.25 percent by weight. The preferred reactive surfactants are anionic vinyl functional surfactants, such as sodium vinyl sulfonate, sodium styrene sulfonate and the like.

The aforementioned polymers are prepared in accordance with this invention by sequential polymerization. This amounts to emulsion polymerization of a first incremental charge of monomers and catalysts comprising the aforementioned monomers and typically all of the vinyl ester monomers to be copolymerized. This is followed by a second incremental monomer charge which is substantially free of vinyl esters and preferably substantially free of the diesters of dicarboxylic acid. The total amount of monomers contained in the second charge is sufficient to consume substantially all the vinyl ester and diesters of dicarboxylic acid monomers left after the first charge.

For a first charge of 90 percent followed by a second charge of 10 percent of total monomers, residual vinyl acetate monomer is expected to be about 0.1 to 0.3 percent of total monomers as compared to about 0.5 to 1 percent if all the monomers are fed incrementally over a continuous period of about 10 hours. The inclusion of the balance of the monomers in a second charge serves to reduce residual vinyl ester monomer content to below about 0.1 percent. It is preferred to add a redox catalyst system at conclusion of the polymerization reaction. This will consume additional residual monomers and reduce vinyl ester levels to about 0.05 percent of total monomers. In addition, for a 3,000 gallon reactor total reaction time is decreased from about 10 hours or more to about 6 hours or less.

Adhesive performance of tackified copolymers of the invention can be vastly improved if the tackifier used comprises a rosin ester, preferably rosin ester extended with hydrocarbon having an acid number of 0 to about 20 to provide excellent adhesion to difficult to bond substrates such as recycled cardboard and high density polyolfins. Loop tack values of greater than 535 Newtons per meter (N/m) can be realized with inclusion of about 28 parts by weight rosin ester tackifier into 100 parts by weight polymer with no significant loss of shear.

The compositions of the invention are extremely ooze-resistant where exposed to the internal temperature of the laser printers. The tests have shown laser cut labels exhibit no sign of adhesive fouling of printed paper labels after processing in excess of 10,000 sheets of labels in a laser printer.

BRIEF DESCRIPTION OF THE DRAWINGS

The attached FIGS. 1 and 2 schematically illustrate the sequentially polymerized copolymers of this invention in comparison to a blend of copolymers particles wherein:

FIG. 2 depicts a physical blend of copolymer particles of monomers comprising the first charge and particles of monomers comprising the second charge while;

DETAILED DESCRIPTION

According to the present invention, there is provided an improved process for forming inherently tacky acrylic PSA emulsion copolymer particles containing polymerized amounts of a vinyl ester such as vinyl acetate and a diester of dicarbolic acid such as dioctyl maleate and novel adhesive products formed therefrom.

The polymerized copolymers comprise a first, or core copolymer formed from a first monomer charge comprised of at least one alkyl acrylate containing 4 to about 12 carbon atoms in the alkyl group, at least one vinyl ester, at least one diester of a dicarboxylic acid and at least one unsaturated carboxylic acid monomer containing from about 3 to about 5 carbon atoms. The first copolymer is present in an amount of at least 50 percent to 95 percent, preferably of about 85 percent to 90 percent and more preferably, about 90 percent by weight of the provided copolymers. A second copolymer, is formed in the presence of the first copolymer from a second monomer charge which is free or substantially free of vinyl esters and preferably free of diesters of dicarboxylic acid.

This polymerization process is known as sequential polymerization. It is believed that the product is a domain-type emulsion copolymer in which the first or core particles form one domain and the second or shell copolymer forms a second domain which partially or continuously surrounds the core.

Figure 1:
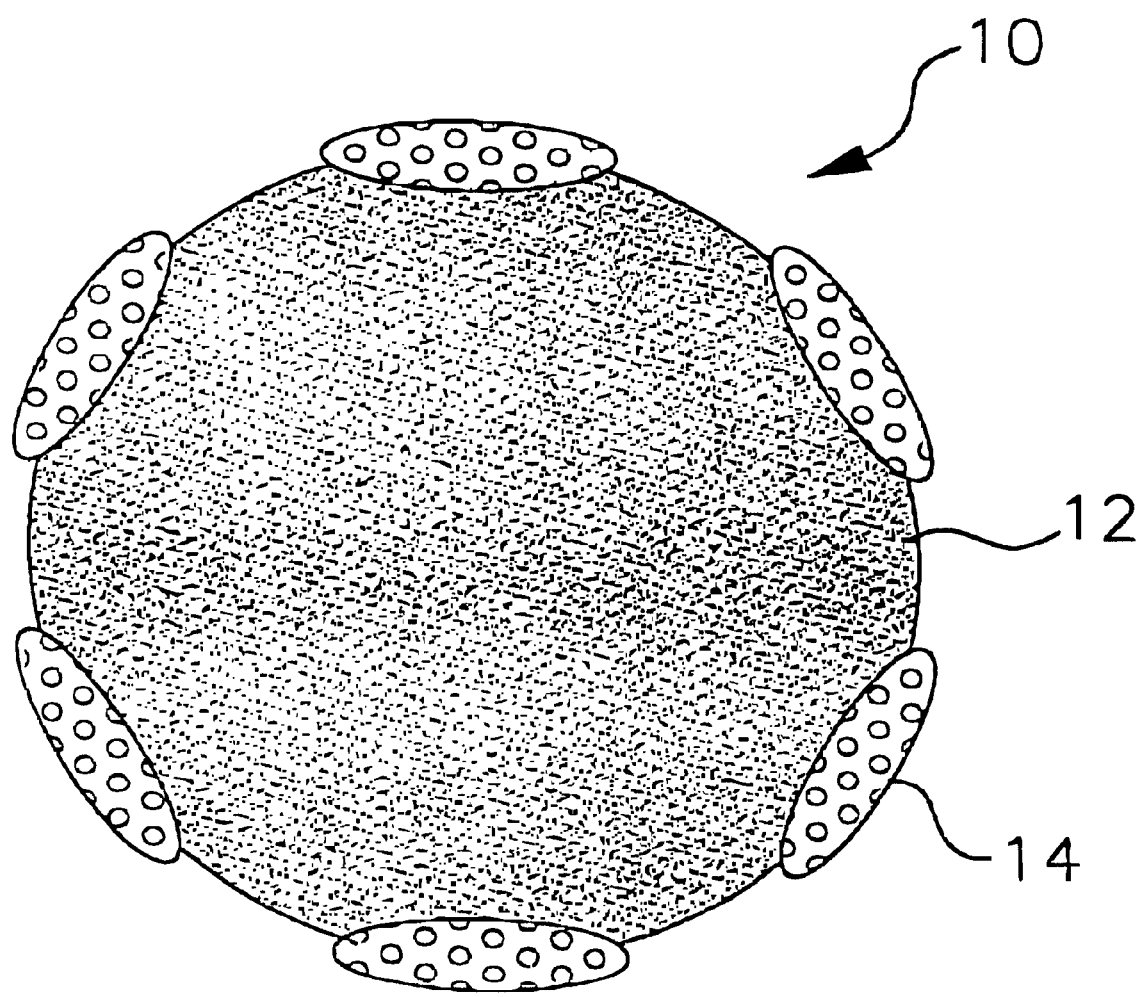
FIG. 1 depicts a sequentially polymerized copolymer particle.
Figure 2:
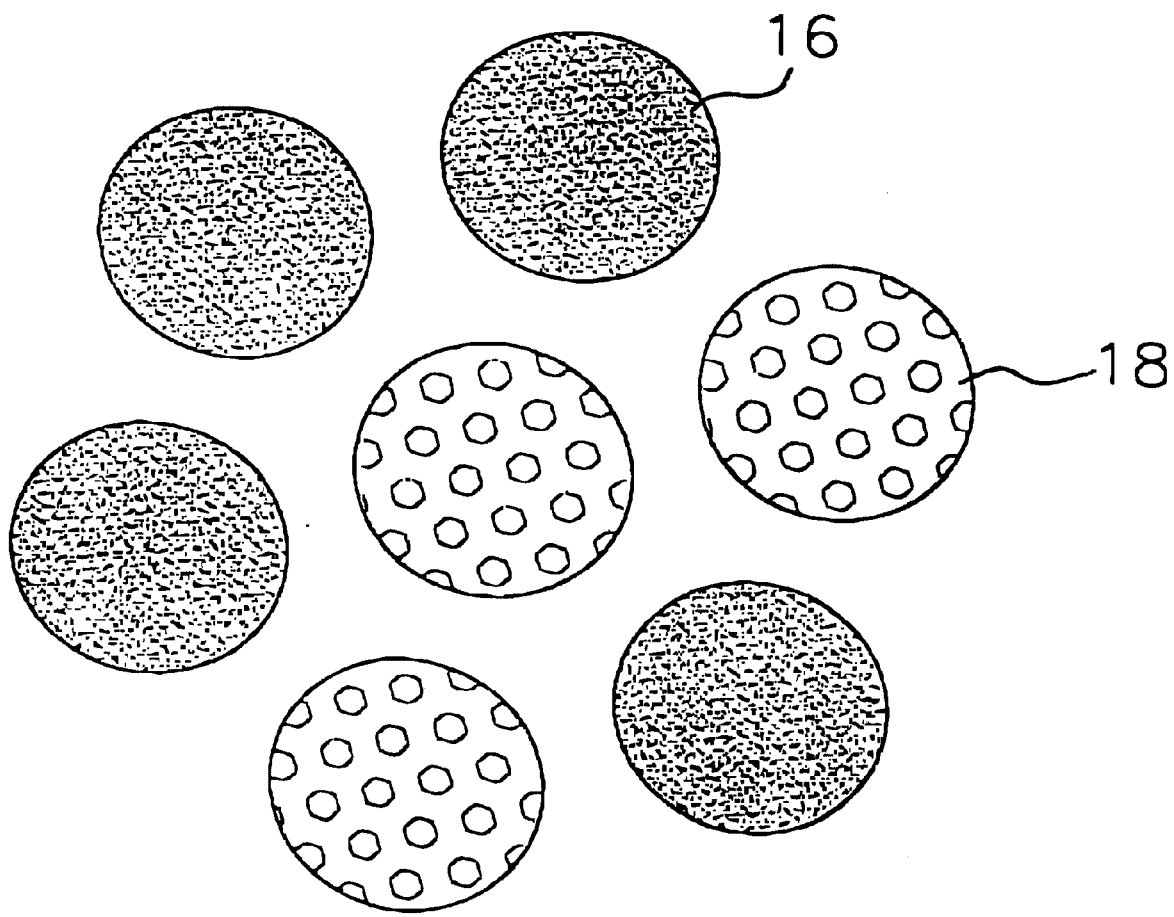

The two systems are depicted to FIGS. 1 and 2. With reference to FIG. 1, a sequentially polymerized copolymer particle is formed in emulsion as particle 10 are comprised of a central domain 12 completely or partially surrounded by second stage polymerized outer domain 14. In their formation, the inner domain is polymerized first, followed by polymerization of the monomers forming the outer domain which associates with and is believed to attach to the initially formed inner copolymers.

As depicted in FIG. 2, if the individual copolymers are separately copolymerized and mixed, they form a random blend of core 16 and shell 18 copolymer particles with little or no attachment or association with each other.

The emulsion based pressure-sensitive adhesives of the instant invention contain, on a percent by weight basis from about 35 to about 95 percent by weight of total monomers subsequently polymerized, of at least one soft monomer preferably an alkyl acrylate containing about 4 to about 12 carbon atoms in the alkyl group and which have a glass transition temperature (Tg) of less than $-25°$ C. Preferably, a mixture of alkyl acrylates are employed with the total alkyl acrylate concentration being in an amount of from about 30 to 65, more preferably 40 to about 50 percent by weight of the monomers. Useful alkyl acrylates include n-butyl acrylate, 2-ethylhexyl acrylate, isooctyl acrylate and the like, with a mixture 2-ethylhexyl acrylate and butyl acrylate being preferred. These are "soft monomers" because of a low homopolymerization glass transition temperature (Tg).

Other soft monomers of the instant invention are one or more diesters of a dicarboxylic acid and mixtures thereof, present in a total amount of from about 0 to about 30 percent by weight based on the total weight of the monomers preferably from 5 to about 30 percent by weight of the monomers. Each ester group of the diester of the dicarboxylic acid independently contains from about 4 to about 12, preferably from about 8 to about 12 carbon atoms. The preferred diesters are di-2-ethylhexyl maleate, di-2-ethylhexyl fumarate and mixtures thereof. The diester monomers improve tack and overall adhesive properties.

The balance of the monomers are "hard monomers" having a homopolymerization Tg greater than about $0°$ C. They include vinyl esters, carboxylic acids and methacrylates.

Vinyl esters may be present in a total amount of from about 15 to about 35 percent by weight, preferably from about 20 to about 25 percent by weight based on total weight of the monomers, said vinyl esters containing from 2 to about 16 carbon atoms in the alkyl group of the ester. Representative of the vinyl esters include vinyl acetate, vinyl butyrate, vinyl propionate, vinyl isobutyrate, vinyl valerate, vinyl versitate, and the like. Vinyl acetate is preferred. The vinyl esters aid in the copolymerization of maleate and fumarate monomers and enhance cohesive strength and peel adhesion.

The inclusion of one or more unsaturated carboxylic acids containing from 3 to about 5 carbon atoms enhances cohesive strength, adhesion to polar surfaces and stabilizes the particles formed during emulsion polymerization. The unsaturated carboxylic acids are provided in a positive amount up to about 5 percent by weight of the polymer, preferably from 1 to about 5 percent by weight. The unsaturated carboxylic acids include, among others, acrylic acid, methacrylate acid, itaconic acid, and the like. Acrylic acid, methacrylate acid, and more preferably mixtures thereof, are presently preferred.

Cohesive strength may be enhanced by inclusion of an alkyl methacrylate containing from 1 to about 8 carbon atoms in the alkyl group and present in an amount of from 0 to 10 percent by weight of the monomers. Methyl methacrylate is presently preferred.

The emulsion adhesives of the instant invention are optionally prepared in the presence of a reactive surfactant which polymerizes during formation of the polymer and becomes an integral part of the polymer. Reactive surfactants include anionic vinyl functional monomers such as sodium vinyl sulfonate, sodium styrene sulfonate and the like. The reactive surfactant is present as part of the total surfactant system and in an amount of from 0 to about 0.4 percent by weight of the total monomers, preferably about 0.1 to about 0.25 percent by weight.

Another component may be a reactive multifunctional monomer which is an acrylate and/or methacrylate preferably having a cyanurate or phosphate moiety and present in an amount of from 0.1 to about 1 percent by weight of the monomers. The multifunctional monomers improve guillotinability without adversely affecting adhesive properties. The presently preferred multi-functional monomers are tris-(2-hydroxy ethyl)isocyanurate triacrylate and bis-(methylacryloxyethyl)phosphate. Still another component may be a chelating monomer.

Presently preferred emulsion polymers contain, exclusive of reactive monomers, about 25 to 35 percent by weight 2-ethylhexyl acrylate, about 15 to 25 percent by weight butyl acrylate, about 20 to 25 percent by weight vinyl acetate, about 15 to 25 percent by weight di-2-ethylhexyl maleate (dioctyl maleate), about 2 percent by weight acrylic acid, and about 2 percent by weight methacrylic acid.

The monomer proportions are normally adjusted in such a way that the adhesive has a glass transition temperature less than about −20° C., giving a good balance of adhesion and tack at room temperature and cold temperatures.

Figure 3:
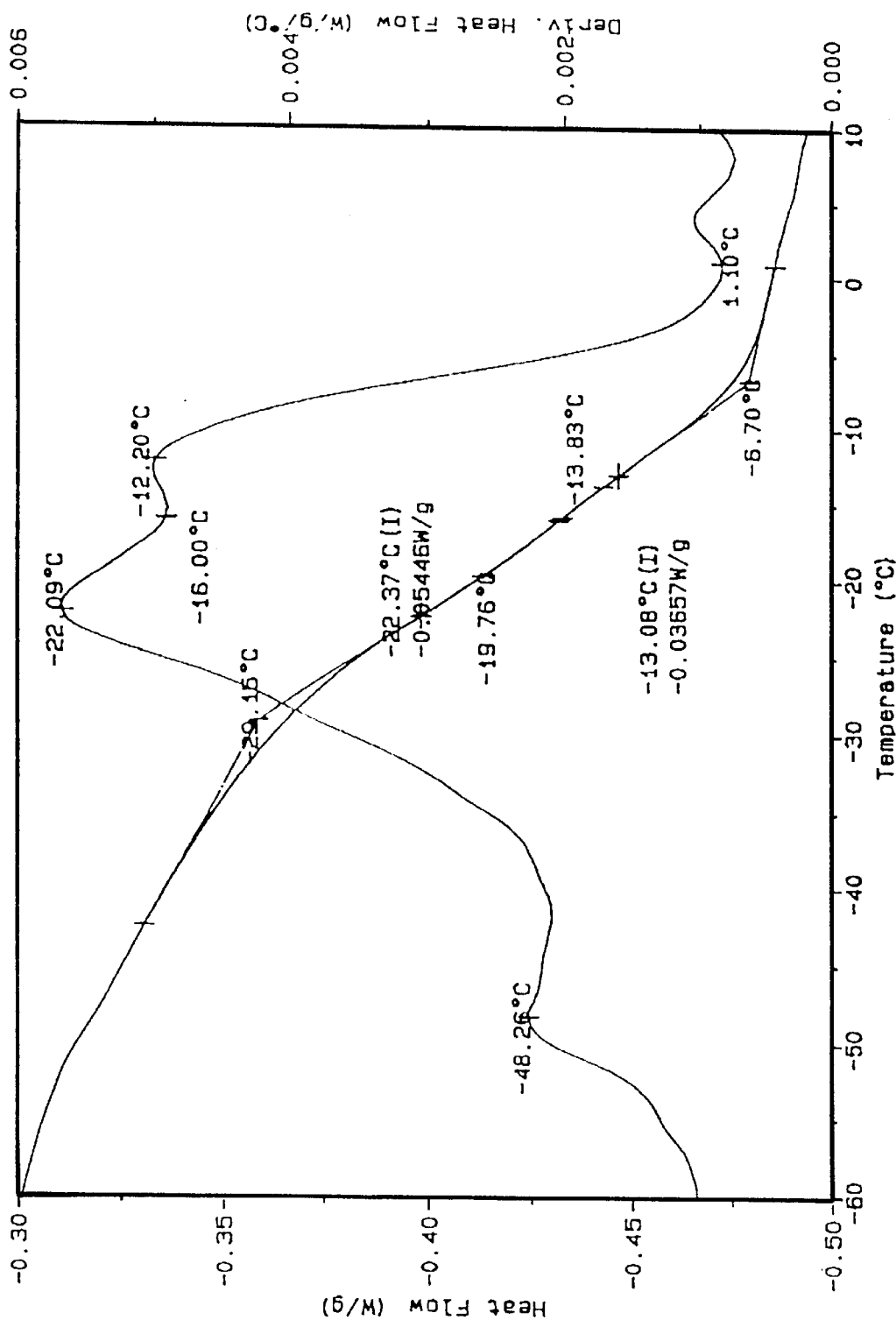
FIG. 3 is a differential scanning calorimeter plot of the copolymer, formed in Example 1.
Figure 4:
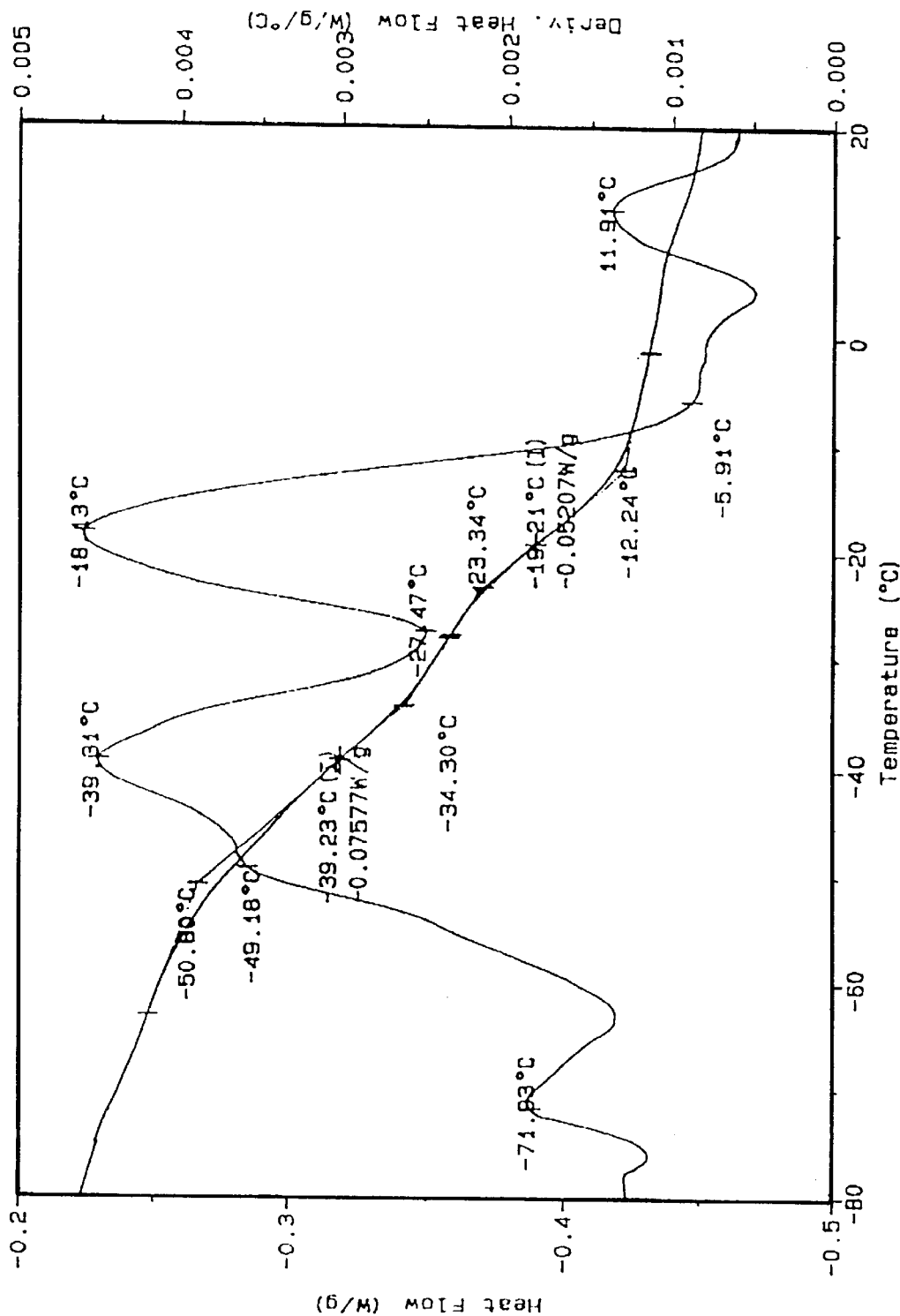
FIG. 4, shows the plot for the tackified adhesive of Example 2.

Because of different monomer content, the core copolymer will have a glass transition temperature different from the shell copolymer. FIG. 3 shows the multiple glass transition temperures over a wide range which gives good adhesive performance over a wide temperature range. As shown in FIG. 4 tackification changes the Tg peaks but also provides multiple peaks over a broad temperature range.

The preferred gel content or percent insolubles are in excess of 60 percent by weight which provides excellent cohesive strength and high performance. In this regard, gel represents the amount of polymer which is insoluble in tetrahydrofuran expressed in percent by weight and determined by the membrane gel partitioning method. In this method, about 600 to 800 milligrams of 100 percent solid polymer is weighed onto a millipore membrane disk of 5 micrometer porosity. The disk is heat sealed and transferred to a scintillation vial. About 20 milliliters of tetrahydrofuron is added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b-c) \times 100}{a} = \% \text{ gel}$$

wherein $a$ = total weight of 100 percent solids polymer $b$ = the weight of the polymer plus membrane before tetrahydrofuron treatment $c$ = polymer plus membrane remaining after tetrahydrofuron treatment.

Other aids which may be used to develop cross-linking include thermal cross-linking and cross-linking by actinic and electron beam radiation.

The polymers of the instant invention are prepared by sequential emulsion polymerization under conditions of agitation in an autogenous atmosphere in the presence of suitable polymerization initiators such as peroxydisulfate and peroxides. Depending on desired polymer properties including gel content, the preferred levels of these initiators are in the range of from about 0.5 to about 1.0 percent by weight based on the total weight of the monomers. The presently preferred initiators are potassium persulfate, t-butyl hydrogen peroxide, and the like.

The emulsion copolymers may be prepared in accordance with the present invention by polymerizing the monomers to yield a first or inner domain copolymer containing the vinyl esters and diesters of dicarboxylic acids, and a second or outer domain copolymer substantially free of vinyl esters and preferably substantially free of polymerized diesters of dicarboxylic acids.

Reaction can be initiated thermally by thermal decomposition of the initiator yielding free radicals. Reaction can also be initiated by addition of a redox catalyst system. Thermal initiation is preferred.

Catalysts, such as potassium persulfate, tertiary butyl hydroperoxide and the like, are employed for polymerization and present in an amount of from about 0.15 to about 0.5 part by weight per 100 parts weight monomers with surfactant levels ranging from about 0.5 to about 5 percent by weight based on weight of the monomers being preferred. Reaction temperature generally ranges from about 65 to about 85° C. and pH ranges preferably from about 2 to about 4. When a buffer is used, pH can range up to about 6.

There may be included "chain-transfer agents" by which there is meant organic compounds containing mono- or multi-mercaptan groups, chlorinated groups, hydroxy groups, and the like, as are known in the art. The presently preferred chain transfer agents are n-dodecyl mercaptan and t-dodecyl mercaptan provided in a concentration from about 0.01 to about 0.1 percent by weight of the monomers.

The first and if desired, the second copolymer may be cross-linked by use of an internal cross-linking agent. Internal cross linking is intended to mean cross-links between chains as opposed to external cross-links which are between preformed emulsion particles. Internal cross linking agents include polyfunctional compounds having at least two non-conjugated carbon-carbon double bonds per molecule which then become part of the polymer during polymerization. It has been found that the amount of internal cross linking agents should not exceed about 3 percent by weight of the total monomer content as no additional benefit is typically observed at higher levels. Examples of suitable internal cross linking agents include diallyl maleate, diallyl phthalate and multifunctional acrylates and methacrylates including polyethylene glycol diacrylate, hexanediol diacrylate, ethoxylated trimethylolpropane triacrylate, pentaerythritol triacrylate, propylene glycol diacrylate and trimethylolpropane trimethacrylate. The polymer composition may further comprise an external cross linking agent to further modify adhesive properties which cause post polymerization cross linking. External cross linking agents include metal salts such as zirconium ammonium carbonate, zinc ammonium carbonate, aluminum acetate, zinc acetate and chromium acetate. The presently preferred external cross linking agent is zirconium ammonium carbonate.

As indicated above, for the process of copolymer manufacture it is desirable to employ a surfactant system present in the amount of from about 0.5 to about 5 parts by weight to 100 parts by weight monomers, preferably about 3 parts per 100 parts by weight of the monomers. The presently preferred surfactant system is an anionic surfactant system. One such surfactant system contains 37.4 percent by weight of the ammonia salt of sulfated nonylphenoxypoly (ethyleneoxy) ethanol, 21.8 percent by weight of sodium dioctyl sulfosuccinate and 40.8 percent by weight sodium lauryl ether sulfate. The combination of anionic surfactants enables the formation of a stable suspension of the acrylic based emulsion copolymers of the invention.

The inclusion of multifunctional monomers enable the monomers to undergo internal cross linking reactions and allow chain transfer agents to control chain length. This differs from externally cross-linked polymers in that the functional groups, such as carboxyl, hydroxyl, and/or amino groups, remain free and available for improving adhesive properties, available for external cross-linking reactions such as by exposure to actinic or electron beam radiation and/or through external cross-linking agents.

At the conclusion of the addition of monomers containing the vinyl esters there is incrementally added a final charge of monomers which are substantially free of the vinyl esters and preferably free of the diesters of dicarboxylic acid. The presently preferred method is to include about 90 percent of total monomers as the first monomer charge forming the core copolymer followed by 10 percent of the monomers forming the shell. Copolymer monomer addition for a 3,000 gallon reactor is over about a 6 hour period. This in itself results in a residual monomer content of about 0.1 to about 0.3 percent of total monomer. At the conclusion of the reaction, there is added a redox system which will reduce any residual vinyl ester content to less than about 0.1 percent after 24 hours. Typical residual vinyl ester content is between about 0.05 to about 0.1 percent as compared to 0.5 to 1 percent vinyl ester for a 3,000 gallon reactor to which the monomers were added continuously over a 10 hour period.

A typical redox system utilizes tertiary butyl hydrogen-peroxide (TBHP) and hydroxymethane sulfuric acid, sodium salt or hydrosulfite AWC from Henkel Corporation, Amber, Pa.

Inherently tacky adhesive copolymers of the invention may be used as such or when tackified or plasticized. While conventional tackifiers and plasticizers may be used, it is presently preferred when the polymers are tackified with rosin ester tackifiers having an acid number from 0 to about 20, preferably about 5 to 15 most preferably about 8 to 10 such as tackifiers sold by Eka Nobel as Snowtack 920. Tackification to a level of 28 parts by weight tackifier per 100 parts by weight resin provides an adhesive composition of an excellent balance of properties of adhesion to cardboard and low energy surface. The amount of tackifier ranges from 0 to about 50, more preferably from about 20 to about 30 parts by weight per 100 parts by weight polymer.

EXAMPLE 1

With reference to Table 1 below, there was formed Soap Solution (A) to which there was added Monomer Mix (1) with agitation for form Pre-Emulsion (1). Monomer Mix (2) and Catalyst Solution (1) formed later addition. All ingredients except potassium (K) persulfate of the Initial Reactor Charge were incrementally fed to a stirred reactor. The charge was heated to 750° C. under agitation and purged with nitrogen. Creating autogenous conditions, potassium persulfate was added to the reactor, mixed for 5 minutes and Pre-Emulsion (1) was fed at the rate of 3.78 parts by weight/minute. Catalyst Solution (1) was fed at 0.50 part by weight per min. Reaction temperature was kept between 78 and 85° C. Thereafter, Monomer Mix (2) was added at 1.89 parts by weight/minute and followed by half of Catalyst Solution (2) and reaction allowed to proceed for 45 minutes. There was then the second half of Catalyst Solution (2) and the reactor held at 80–83° C. for 45 minutes. There was then added half of Catalyst Solution (3), the reactor held at between 80 and 83° C. for 30 minutes. The Reducing Agent was then added.

After mixing for 15 minutes, Catalyst Solution (3) was added and the batch cooled to 30° C. The product formed had a solids content of about 50 percent with a residual monomer content of 0.09 percent vinyl acetate, 0.17 percent 2-ethyl hexyl acrylate and 0.11 percent dioctyl maleate.

TABLE 1

|  | Parts by Weight (%) | |
| --- | --- | --- |
| Soap Solution (A) | | |
| De-ionized $H_2O$ | | 106.25 |
| Polystep, J-927 | | 58.93 |
| Total | | 165.18 |
| Monomer Mix | (1) | (2) |
| 2-ethyl hexyl acrylate, 2-EHA | 218.48 | 54.61 |
| Vinyl acetate, VAC | 119.48 | — |
| Dioctyl maleate, DOM | 165.14 | — |
| Acrylic acid, AA | 5.74 | 1.15 |
| Methacrylic acid, MAA | 5.74 | 1.15 |
| Total | 514.58 | 56.91 |
|  | (90%) | (10%) |
| Catalyst Solution (1) | | |
| De-ionized $H_2O$ | | 115.67 |
| K-persulfate | | 2.18 |
| $NaHCO_3$ | | 0.71 |
| Total | | 118.56 |
| Initial Reactor Charge | | |
| De-ionized $H_2O$ | | 100.27 |
| Polystep J-927 | | 0.39 |
| Na-Vinyl sulfonate | | 4.67 |

TABLE 1-continued

| | Parts by Weight (%) |
|---|---|
| K-persulfate | 1.05 |
| Total Catalyst Solution (2) | 106.38 |
| De-ionized H$_2$O | 11.56 |
| K-persulfate | 1.05 |
| Total Catalyst Solution (3) For Cook-Off | 11.91 |
| De-ionized H$_2$O | 9.66 |
| Polystep J-927 | 0.29 |
| T-BHP | 3.85 |
| Total Reducing Agent | 12.80 |
| De-ionized H$_2$O | 5.70 |
| Hydrosulfite AWC | 0.85 |
| Total Rinse H$_2$O | 6.55 |
| De-ionized H$_2$O | 7.13 |
| Total | 7.13 |
| Grand Total | 1000.00 |

Control 1

The procedure of Example 1 was repeated, except that all of the monomer were combined and incrementally fed to the reactor over a 10 hour period. Residual monomer content was 0.4–0.6 percent vinyl acrylate, about 1 percent dioctyl maleate and about 0.2 percent 2-ethylhexyl acrylate.

EXAMPLE 2

The emulsion of Example 1 was adjusted to a pH of 6.5–7.5 using a 26 percent ammonium hydroxide solution and tackified with an anionic/nonionic stabilized disproportionate rosin glycol ester having an acid value less than 20, known as Snowtack 920, manufactured by EKA Nobel Paper Chemicals and Resins B.V., The Netherlands, under agitation. There was also added tackifying resin emulsion biocide (Kathon LX) from Rohm and Hass and mixture filtered through aseptic filter to give a product of the composition shown in Table 2. Residual monomer content was about 0.1 percent vinyl acetate, 0.09 percent 2-ethyl hexyl acrylate and 0.06 percent dioctyl maleate. The tackified emulsion polymer was transfer coated on to a silicon release liner then laminated to 50 lb. DSX paper. Coated weight was 20–23g/m$^2$ made by polymer of Example 1.

TABLE 2

| | Parts by Weight | (Dry on Dry Basis), (%) |
|---|---|---|
| | 100.00 | (78.02) |
| 26% NH$_4$ OH (active substance) | 0.17 | (0.128) |
| Snowtack 920 (EKA NOBEL) | 28.00 | (21.850) |
| Kathon LX (1.5%) (R&H) | 0.002 | (0.002) |
| Total | 128.172 | (100.000) |

Table 3 compares the properties to other PSA's

TABLE 3

| Test/ Substrate Example/ Control | 90° Peel, Untreated HDPE, 10 min dwell, N/m | 90° Min. Peel, Recycled Corrugated Cardboard, 10 min. dwell, N/m | Looptack, Untreated HDPE, N/m | Looptack, Recycled Corrugated Cardboard, N/m |
|---|---|---|---|---|
| Example 2 | Face Tear* | 196 | 651 | 364 |
| Control 2 | 239.9 | 180 | 359 | 298 |
| Control 3 | 236.45 | 161 | 359 | 289 |
| Control 4 | 292.4 | 172 | 648 | 336 |

* Adhesion exceeds paper strength and exceeds adhesion of the controls.

where Control 2 is the product of U.S. Pat. No. 5,129,126; Control 3 is Control 2 tackified with Picolyte 64 from Hercules; and Control 4 is an emulsion PSA known as Kanzaki ST-90.

The above adhesive values were based on an average of three runs, with five randomized samples. Peel was determined using test PSTC Test No. 2–6th edition, Looptack by PSTC Test No. 5–6th edition with the exception that the roll down for the 90° peel was an 8-lb roller in five repetitions. The materials were conditioned and tested under Tappi conditions of 50 percent RH at 72° F.

Residual monomer content was determined using gas chromatography when a known amount of polymer was dissolved in tetrahydrofuran and a solution analyzed by gas chromatography for residual monomer content. The residual monomers are separated on a fuzed silica column as a polar stationary phase using a helium gas mobile phase. The residual monomer is:

$$\frac{\text{weight of residual monomer}}{\text{weight of sample}} \times 100$$

What is claimed is:
1. A sequential polymerization process for the production of inherently tacky, pressure-sensitive adhesive emulsion polymer particles from a total monomer charge comprising:
   (i) at least one alkyl acrylate containing from about 4 to about 8 carbon atoms in the alkyl group and present in a total amount of 30 to about 65 percent by weight of the monomers;
   (ii) at least one vinyl ester containing from about 2 to about 16 carbon atoms in the alkyl chain of the acid, the total of the vinyl esters being present in an amount of 15 to about 35 percent by weight of the monomers;
   (iii) at least one diester of a dicarboxylic acid present in a total amount of from about 20 to about 85 percent by weight of the monomers, each diester independently containing from 8 to about 16 carbon atoms in the alkyl group of the ester; and
   (iv) a positive amount up to about 5 percent by weight of the monomers of at least one unsaturated carboxylic acid;
said process comprising:
   feeding over a first period of time a first monomer charge containing a portion of the total monomers and a polymerization catalyst to an emulsion polymerization reactor; and
   polymerizing the first charge in the presence of the catalyst over at least a portion of the first period of time, wherein the polymerization of the first monomer charge is initiated at a temperature of at least about 65° C.; and thereafter feeding to the reactor a second monomer charge having a composition different than the first monomer charge and comprising the remainder of the total monomers and polymerizing the second monomer charge in the presence of a catalyst.

2. The process according to claim 1, wherein the first monomer charge is polymerized at a temperature ranging from about 65° C. to about 85° C.

3. A process as claimed in claim 1 in which at the conclusion of polymerization of the second charge of monomers there is added a redox catalyst to polymerize at least residual vinyl ester monomers to reduce residual vinyl ester monomer to less than about 0.1 percent of total monomers.

4. A process as claimed in claim 1 in which the stabilizer system includes a reactive surfactant selected from the group consisting of sodium vinyl sulfonate and sodium styrene sulfonate.

5. A process as claimed in claim 1 in which following the conclusion of the reaction, formed emulsion containing inherently tacky emulsion polymer particles are tackified with a rosin ester tackifier having an acid number from 0 to about 20.

6. A process as claimed in claim 5 which the tackifier is present in an amount of from about 20 to about 100 parts by weight per 100 parts by weight polymer particles.

7. A process as claimed in claim 1, wherein the first monomer charge contains from about 50 to about 95 percent by weight of the total monomers.

8. A process as claimed in claim 1, wherein the first monomer charge contains from about 85 to about 90 percent by weight of the total monomers.

9. A process as claimed in claim 1, wherein the first monomer charge contains substantially all of the vinyl ester.

10. A process as claimed in claim 1, wherein the first monomer charge contains substantially all of the vinyl ester and diester of dicarboxylic acid.

11. A process as claimed in claim 1, wherein the sequential polymerization occurs in the presence of a stabilizer system for the formed sequentially polymerized emulsion polymer particles.

12. A process as claimed in claim 1, wherein an initial monomer charge is not provided prior to the feeding of the first monomer charge.

13. A process as claimed in claim 1, wherein the total monomer charge consists essentially of:

(i) at least one alkyl acrylate containing from about 4 to about 8 carbon atoms in the alkyl group and present in a total amount of about 30 to about 65 percent by weight of the monomers;

(ii) at least one vinyl ester containing from about 2 to about 16 carbon atoms in the alkyl chain of the acid, the total of the vinyl esters being present in an amount of 15 to about 35 percent by weight of the monomers;

(iii) at least one diester of a dicarboxylic acid present in a total amount of from about 20 to about 35 percent by weight of the monomers, each diester independently containing from 8 to about 16 carbon atoms in the alkyl group of the ester; and (iv) a positive amount up to about 5 percent by weight of the monomers of at least one unsaturated carboxylic acid.

14. A process as claimed in claim 1, wherein the total monomer charge comprises:

(i) 2-ethylhexyl acrylate in an amount of about 25 to about 85 percent by weight of the monomers;

(ii) butyl acrylate in an amount of about 15 to about 25 percent by weight of the monomers;

(iii) vinyl acetate in an amount of about 20 to about 25 percent by weight of the monomers; and (iv) di-2-ethylhexyl maleate in an amount of about 15 to about 25 percent by weight of the monomers.

15. A process as claimed in claim 14, wherein the total monomer charge further comprises about 2 percent by weight acrylic acid and about 2 percent by weight methacrylic acid.

* * * * *